(12) United States Patent
Saari et al.

(10) Patent No.: US 8,167,115 B2
(45) Date of Patent: May 1, 2012

(54) METHOD OF SUPPORTING AN UNLOADING CONVEYOR BRIDGE

(75) Inventors: Ilkka Saari, Pori (FI); Arvo Jonkka, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 12/628,707

(22) Filed: Dec. 1, 2009

(65) Prior Publication Data

US 2010/0074724 A1 Mar. 25, 2010

Related U.S. Application Data

(63) Continuation of application No. PCT/FI2008/050267, filed on May 13, 2008.

(30) Foreign Application Priority Data

Jun. 6, 2007 (FI) .................................. 20070450 U

(51) Int. Cl.
*B65G 49/00* (2006.01)
(52) U.S. Cl. .................. 198/600; 198/861.4; 198/626.4; 198/587; 414/140.9; 414/140.8
(58) Field of Classification Search .................. 198/600, 198/861.4, 626.4, 861.3, 587; 414/140.9, 414/140.8
See application file for complete search history.

(56) References Cited

U.S. PATENT DOCUMENTS

| 4,047,822 | A | * | 9/1977 | Lehmann | ...................... 403/187 |
| 5,320,471 | A | * | 6/1994 | Grathoff | ..................... 414/140.9 |
| 5,655,647 | A | * | 8/1997 | Wheeler | ..................... 198/861.5 |
| 6,296,109 | B1 | * | 10/2001 | Nohl | .............................. 198/632 |
| 6,497,535 | B1 | * | 12/2002 | Thomas | ........................ 405/222 |
| 2004/0202530 | A1 | | 10/2004 | Hanig | |
| 2005/0201851 | A1 | * | 9/2005 | Jonkka | .......................... 414/133 |

FOREIGN PATENT DOCUMENTS

WO WO 2004/065272 A1 8/2004

OTHER PUBLICATIONS

*International Search Report (PCT/ISA/210) for PCT/FI2008/050267 mailed Sep. 3, 2008.
*Written Opinion (PCT/ISA/237) for PCT/FI2008/050267 mailed Sep. 3, 2008.
*Finnish Search Report for FI 20070450 dated Dec. 18, 2007.

* cited by examiner

*Primary Examiner* — Kavel Singh
(74) *Attorney, Agent, or Firm* — Buchanan Ingersoll & Rooney

(57) ABSTRACT

The invention relates to method of supporting a unloading conveyor bridge extending substantially horizontally at the bottom level of a bulk material pile storage, implemented as supports in the area of the bridge ends as well as in at least one point therebetween. At least one of the supports is positionally adjusted in the vertical direction. The support force is thereby kept substantially constant at the actual support point. For the adjustment can be used spring loading, fluid pressure loading or gravity loading, for example.

12 Claims, 6 Drawing Sheets

METHOD OF SUPPORTING AN UNLOADING CONVEYOR BRIDGE

Figure 1:
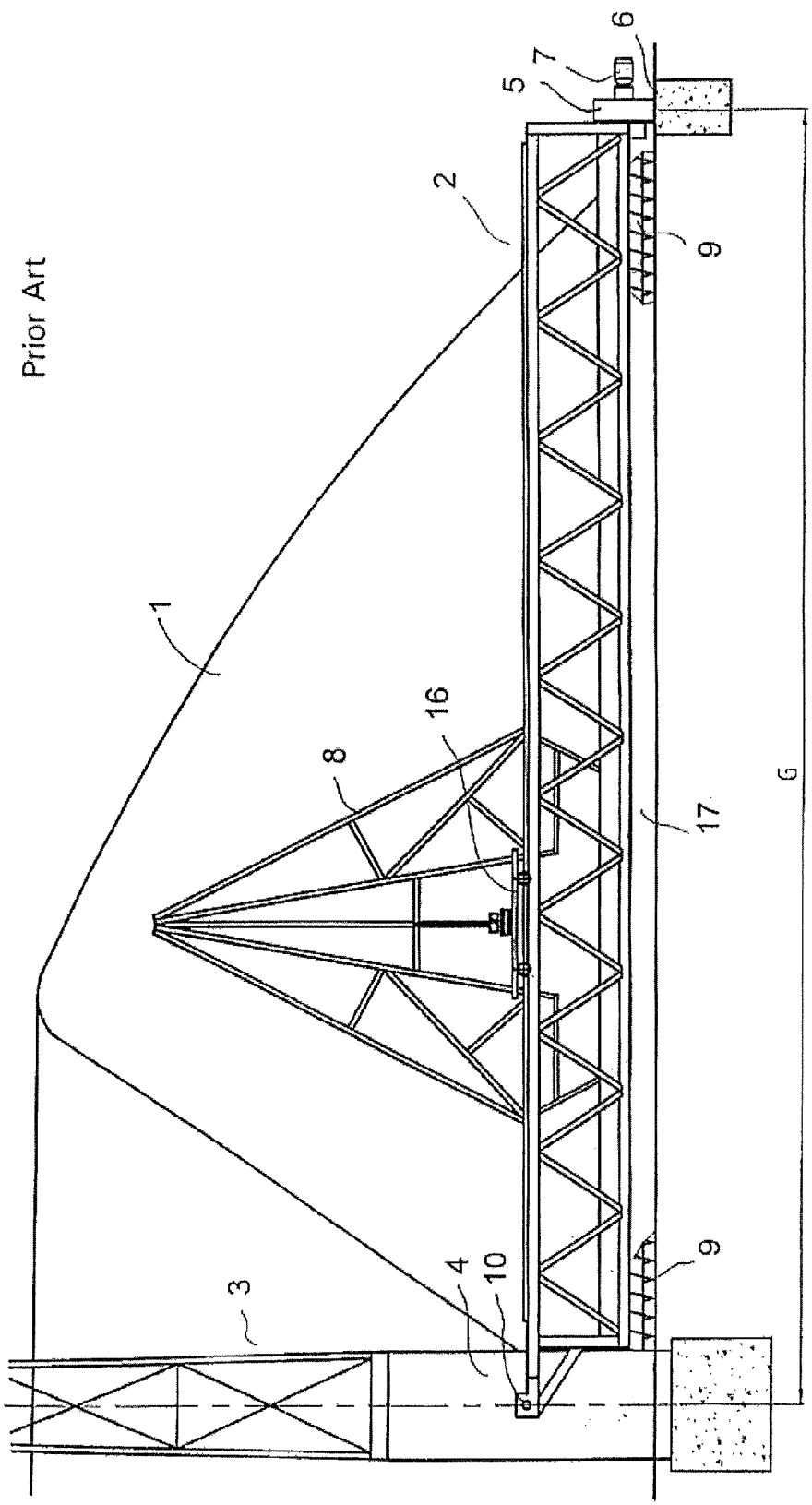

The invention relates to a method of supporting a unloading conveyor bridge, which bridge contains a conveyor discharging bulk material in an annular stack. While the invention most preferably is related to stack unloaders used in the storage of wood chips, it is also applicable in unloading storage stacks used in the storage of other granular material such as bark, coal, grain etc.

It is known that a method in which the chips are collected into an annular pile having typically a diameter of 80 to 150 meters and a height of 20 to 30 meters is used for storing chip. In the method, green chips are brought to one end of the pile while stored chips are discharged from the other end of the pile.

The green chips are conveyed at the top of the storage by a belt conveyor, placed on a conveyor bridge, to the upper part of a tower-like structure located in the center of the annular pile. Below the conveyor bridge, on the upper part of the tower, a continuously rotatable boom is supported. The chips are led, through a hopper, onto a belt conveyor placed on the boom which then creates a curved pile around the tower. The pile is unloaded at the bottom level of the pile by means of a unloading conveyor moving continuously around the tower in one direction. The bridge supporting the unloading conveyor also comprises a rake-like lattice moving back and forth in the direction of the bridge by means of a drive to make the stack to collapse onto the unloading conveyor. The unloading conveyor conveys the chips to a conveyor placed beneath the chip storage through a hopper located at the base of the tower. An apparatus loading and unloading an annular curved stack is described in WO2004/065272.

The unloading conveyor bridge is supported by the central tower at one end. At the outer periphery of the pile, it is supported by supporting wheels. A track along which the wheels run extends around the outer periphery of the pile. One or more of the supporting wheels are provided with a drive making the bridge to rotate around the central tower. The demand on larger chip storages necessitates a longer conveyor imposing more requirements on the bridge carrying it. Being more heavily built, it is more expensive to construct.

A method in which granular material contained in a silo is discharged by a screw discharger moving around the center of the silo is known from US 2004/0202530. The screw is supported at both ends and at the center. The apparatus being relatively lightly built compared to chip dischargers, the method is only applicable in discharging fine material such as grain. And the screw being fixed integral, the deviation between the levels of the support tracks in the center and on the outer periphery of the screw should be within a relatively small tolerance in order to avoid too high bending stresses on the screw. As for grain silo sizes, it is possible to arrange the track levels within a tolerance fine enough since the silo is built on a uniform foundation anyway.

When the diameter of the annular chip pile exceeds 100 meters, the level deviations of the tracks become too high for an integral bridge with three-point support, if the foundation costs of the support tracks of the support devices are to be kept reasonable. Besides, during their service years, the support tracks may experience level changes even with the current foundations.

The method according to the invention makes it possible to reduce the bending stress on a unloading conveyor bridge and to provide more lightly built unloading conveyor bridges. The method can be accomplished by making at least one of the supports of the unloading conveyor bridge positionally adjustable in the vertical direction. This construction enables the support force to stay substantially constant at said support point. Thus, no unreasonable requirements are imposed on the uniformity of the support tracks.

Figure 2:
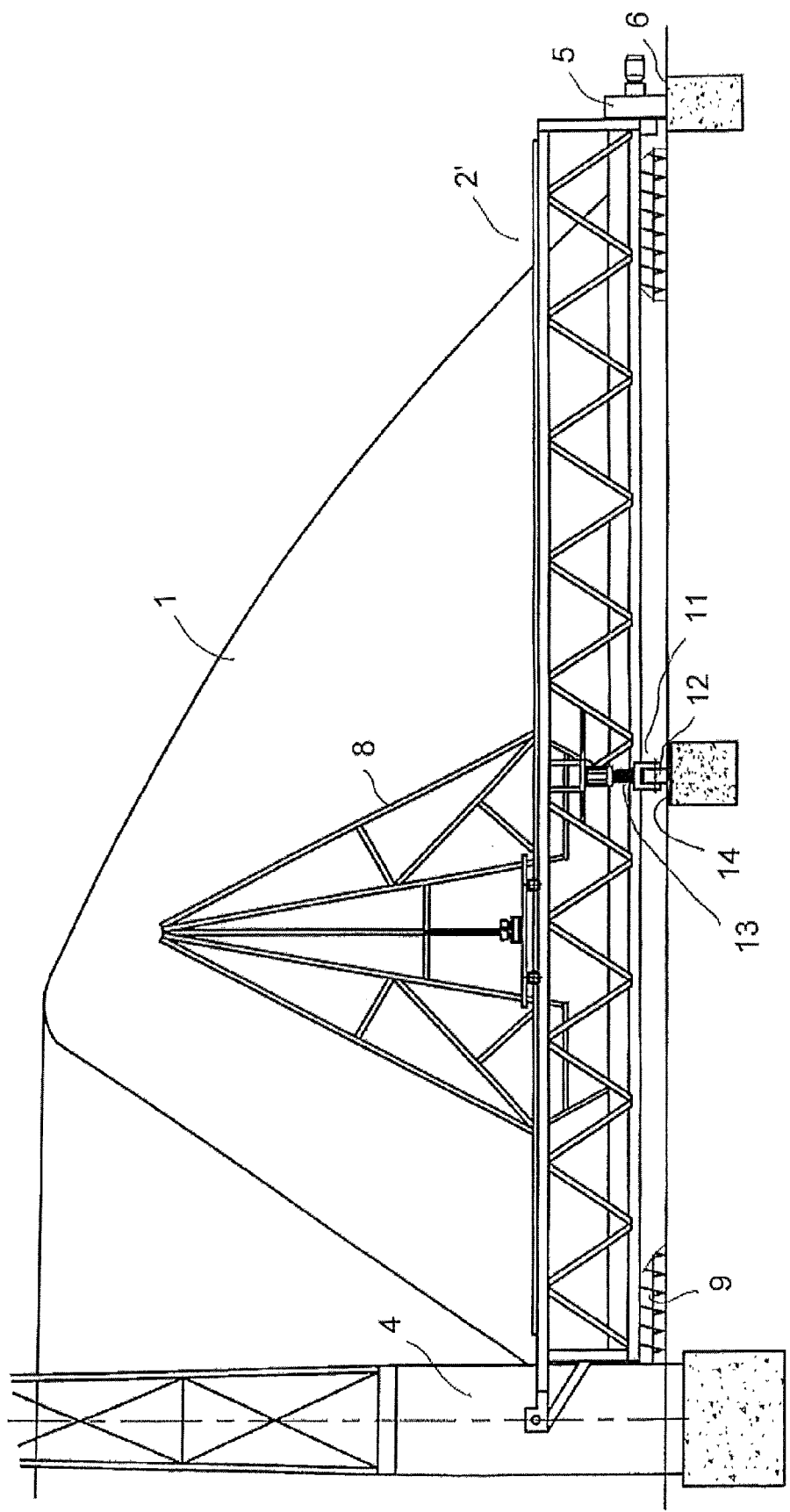
Figure 3:
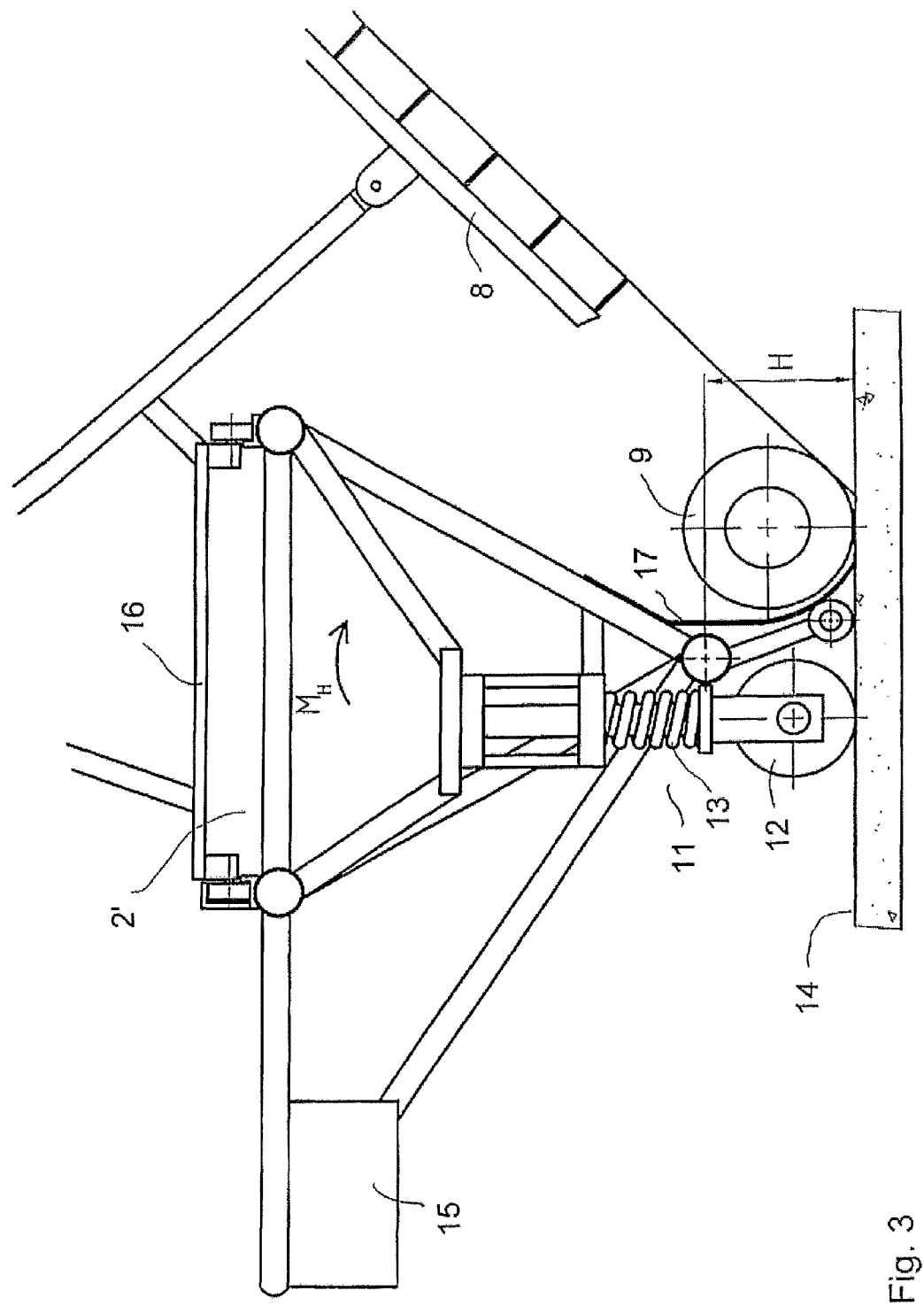
Figure 4:
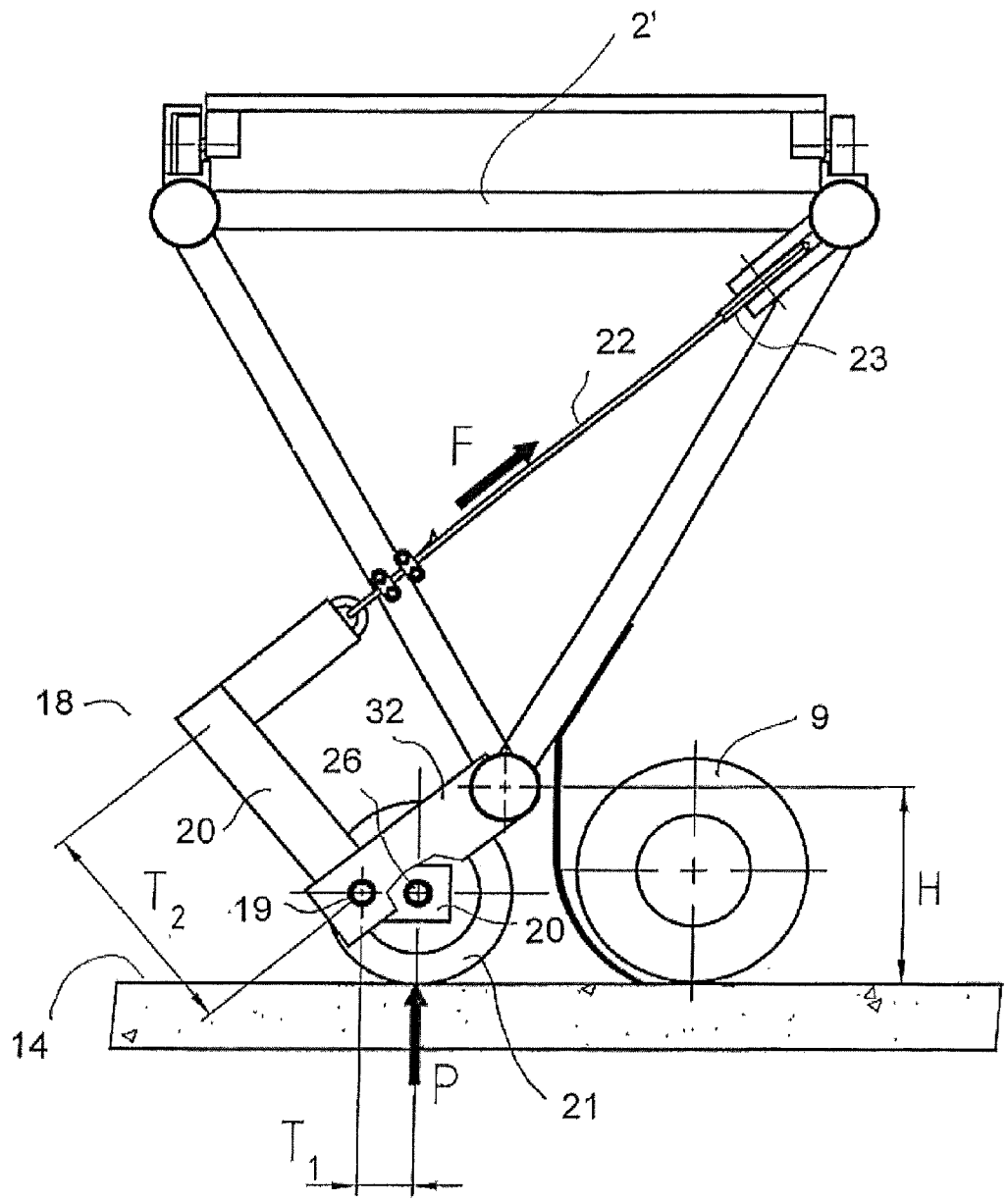
Figure 5:
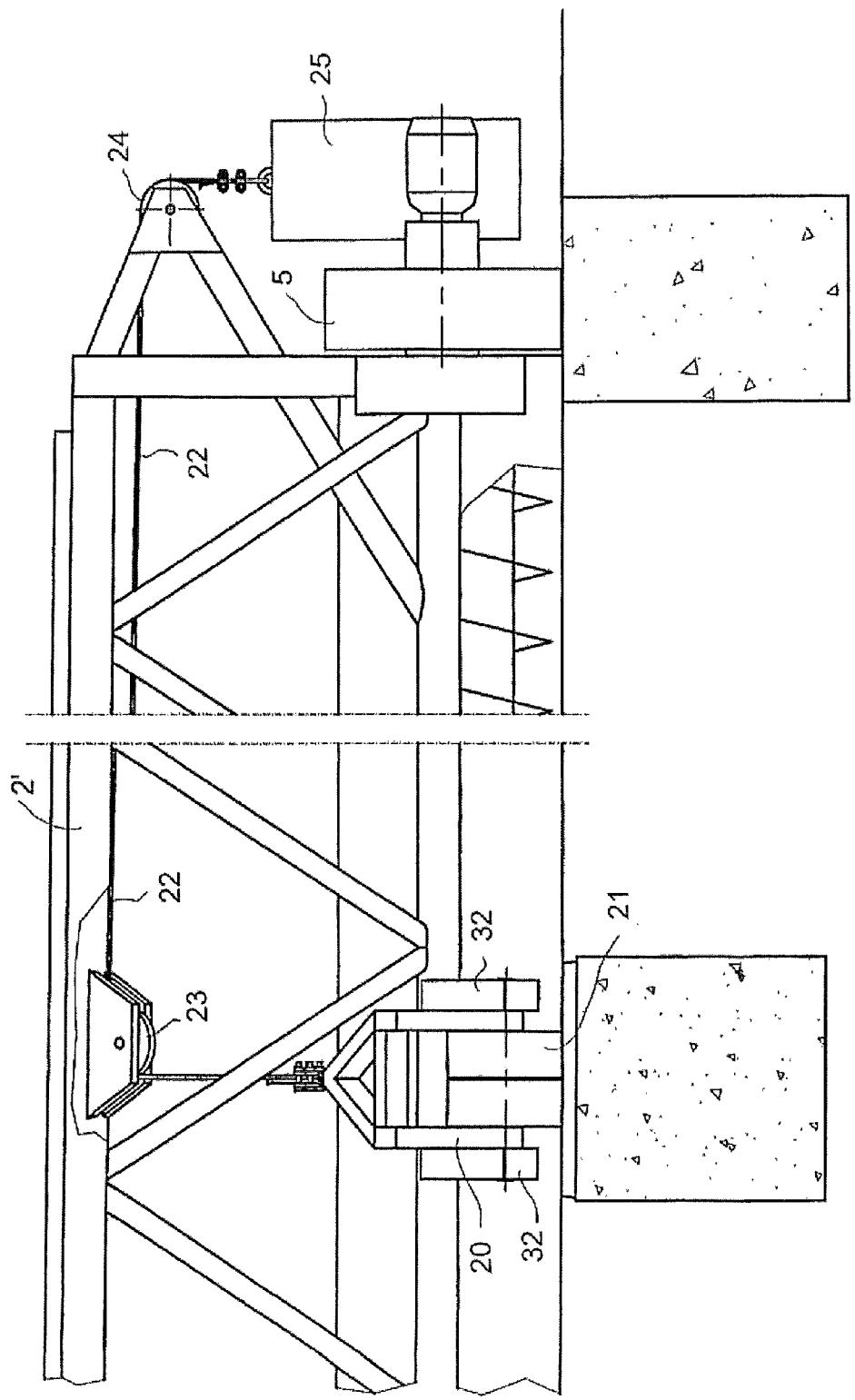
Figure 6:
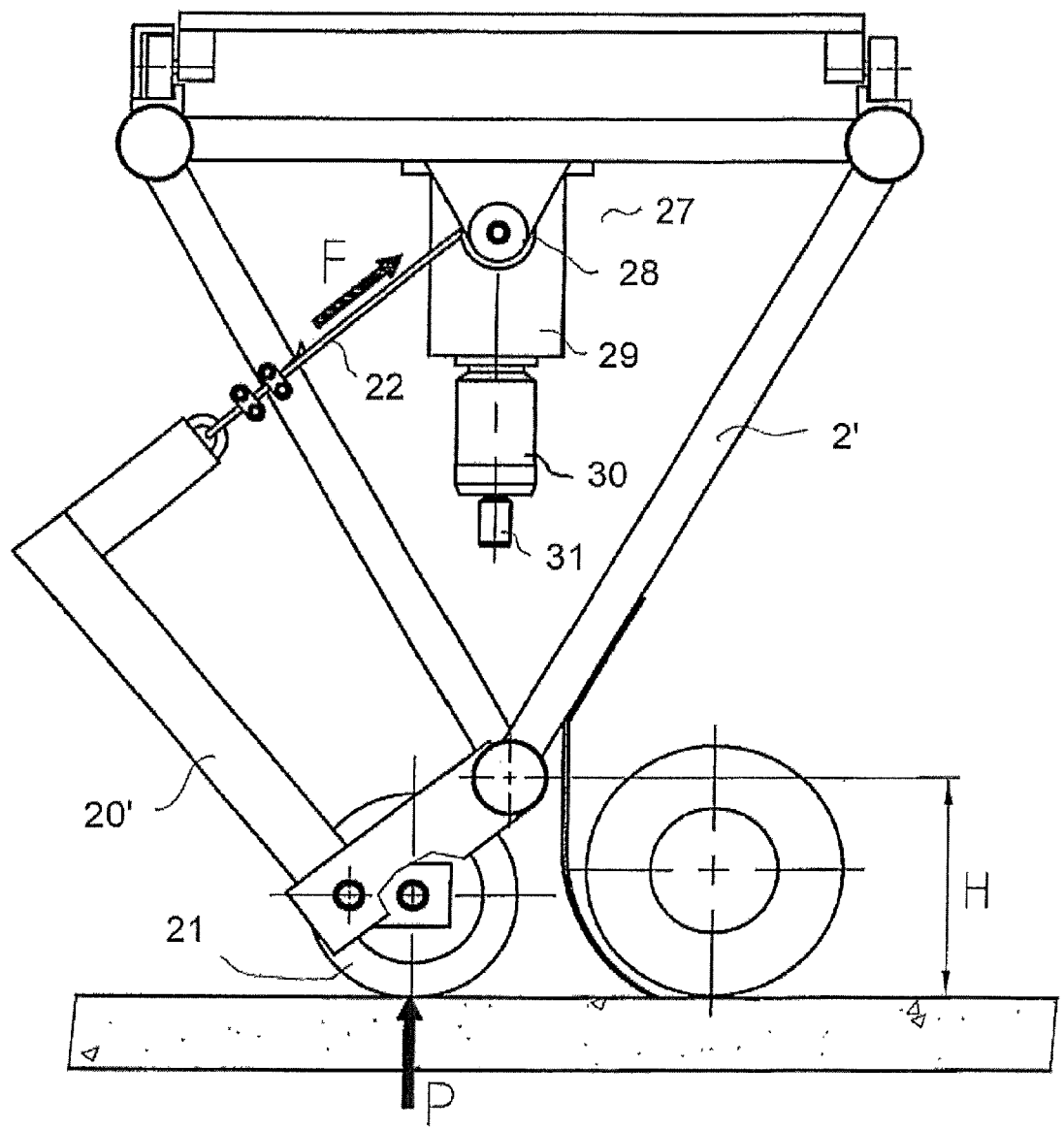

In the following, the invention and the details thereof will be explained in more detail with reference to the accompanying drawings in which FIG. 1 shows a prior art unloading conveyor bridge for a curved pile, provided with a discharger screw, FIG. 2 shows an embodiment of the intermediate support of the unloading conveyor bridge according to the present invention, FIG. 3 is cross-sectional view of the unloading conveyor bridge of FIG. 2, drawn at the intermediate support, FIG. 4 shows another embodiment of the intermediate support of the unloading conveyor bridge, FIG. 5 is a side-view of the support solution of FIG. 4, and FIG. 6 shows a modification of the support solution of FIG. 4.

FIG. 1 shows an unloading apparatus for a curved pile 1. The parts creating the pile are not shown. At one end, the unloading conveyor bridge 2 is supported by the lower part of a freely rotatable central tower 3. At the outer periphery of the pile, the bridge is supported by supporting wheels 5, possibly by a plurality of them. The supporting wheels 5 placed one after another move along a track 6 encircling the pile. Usually, there are at least 4 supporting wheels, and their loads are equalized by means of two bogie beams. At least two of the wheels 5 are provided with a drive 7 which makes the bridge to rotate around the central tower 3. The bridge 2 is provided with a collapse rake 8 and conveyor screws 9, the screws having generally a length of 6 to 10 meters. The screws 9 are placed one after another and supported at the bridge 2. The screws 9 convey the chips to the center of the tower 3 wherefrom the chips are dropped onto a belt conveyor placed beneath the pile. The belt conveyor is not shown.

The bridge 2 only being supported at the center of the pile, on both sides of the tower 4, by means of an articulated joint 10, as well as at the outer periphery of the pile by means of wheels 5, no high requirements are placed on the evenness of the support track 6 extending around the outer edge. As a consequence, the foundation costs of the track are reasonable. According to this solution, the bridge 2 must have a structure capable of carrying the collapse rake 8 and the screws 9 in the area G between the support points. The length of G is 35 to 70 meters, and it is obvious that greater lengths will be needed in the future. The moment $M_H$ applied to the bridge by the collapse rake 8, shown in FIG. 3, of which, in practice, only a part can be balanced by a counterweight connected to the carriage 16, places extra demands on the unloading conveyor bridge 2 structure according to FIG. 1.

With a long span, the problems of the unloading conveyor bridge 2 shown in FIG. 1 will be its heaviness and high construction costs. The bridge not only has to bear its own weight but also the massive discharger screw 9 and the back plate 17 thereof. The biggest constructional problem with the unloading bridge is the rake 8 and the transfer carriage 16 thereof.

According to the embodiment of the invention shown herein as an example, the bridge is provided with an intermediate support reducing the load carried by the bridge. The intermediate support supports the bridge at the middle and carries a considerable part of the load of the bridge. Consequently, the load of the wheels located at the outer end of the bridge can drop approximately by half.

However, the rotational force, which still is best provided by means of wheels disposed in the end of the bridge, must also be taken into account in the rigidity of the unloading conveyor bridge. Furthermore, the tower or the supporting wheel located at the outer periphery must take the unbalanced portion of the collapse rake's moment $M_H$ torquing the bridge, and the variation thereof, via the bridge.

FIGS. 2 and 3 show a unloading conveyor bridge 2' according to an embodiment of the invention and the intermediate support 11 thereof. A wheel, or a pair of wheels 12, taking a portion of the load of the bridge, is mounted in the middle of the bridge 2'. The wheel 12 has a vertically flexible connection with the unloading bridge 2'. A spring 13 between the wheel 12 and the bridge 2' yields according to level differences of the support track 14. The spring 13 enables a sufficient support force in the middle of bridge in spite of an increase in the vertical distance between the support track 14 and the bridge 2'. The spring 13 is chosen so as to minimize the change of the support load taken by the wheel 12 within a given vertical movement area.

This arrangemang makes it possible to support the bridge in three points, and small vertical deviations in the support tracks 14, 6 do not cause problems.

Alternatively, the vertical movement of the wheel 12 placed in the middle of the bridge, which follows changes in the support track, can be provided using fluid pressurization, such as hydraulically, instead of a spring. The wheel is placed at the end of the rod of the hydraulic cylinder. The pressure of the hydraulic fluid is measured by a pressure gauge. If the pressure drops, more oil is pumped into the cylinder with the result that the distance between the wheel and the bridge increases but the load carried by the wheel stays constant.

The flexible suspension can also be provided by means of an electrically operated jack and necessary lever mechanisms. The load on the bridge can be observed by means of strain gauges embedded in the structure, for example.

In FIG. 3, a counterweight 15 is connected to the bridge 2', at the supporting wheel 12 located in the central area of the bridge. The discharger screw 9 makes it difficult to position the supporting wheel 12 in the cross-sectional center-of-mass of the structure formed by the bridge 2' and the screw 9 in the cross-sectional direction. By adding the counterweight 15 to the opposite side of the bridge 2' with respect to the screw 9, the center-of-mass can be arranged at the supporting wheel 12.

FIGS. 4 and 5 show another arrangemang for supporting the midpoint of the bridge 2' A wheel, or wheels, 21 mounted, by articulation bearings 26, to the lower end of an articulated arm 20 rotating around a pivot 19 constitute a supporting wheel 18 and wheel system. The pivot 19 is connected to frame structure 32 of the bridge 2'. There can be one or more wheels adjacent to each other. In FIG. 5 two wheels are shown. On the side opposite to the pivot 19, the upper end of the articulated arm 20 is connected to a cable wire 22. The cable wire 22 runs via freely rotatable pulleys 23, 24 and has a weight 25, shown in FIG. 25, connected to its other end. The weight 25 is located on the other side of the wheels 5 on the outer periphery of the bridge 2'. The weight 25 is chosen so as to satisfy the moment equation $F T_2 = P T_1$ with respect to the pivot 19. F is the pull force applied to the upper end of the articulated arm 20 by the cable wire 22, and P is the support force from the support track 14 to the wheel 21. The thrust forces $T_2$ and $T_1$ are shown in FIG. 4. By changing the ratio of the lengths of the thrust forces $T_2/T_1$ it is possible to affect the magnitude of the force F. When the ratio is increased, the required force F decreases and the weight 25 can also be decreased.

The cable wire 22 being able to move almost freely by means of the bogie wheels 23, 24, the wheel 21 rotates around the pivot 19 according to deviations in the support track 14. The deviations in the support track, i.e. the changes in the measure H, are relatively small, meaning that the movement of the wheel is almost vertical. In spite of the movement, the wheel supports the bridge with a force P that is almost constant. The negligible variations in the support force P are due to the transmission coefficient between the pivot 19 as well as the cable wire 22 and the bogie wheels 23, 24. The weight 25 can be placed in the central tower 4 instead of the outer periphery of the bridge 2'.

As shown in FIG. 6, a winch 27 can be used instead of a weight. The cable wire 22 extending from the upper end of the articulated arm 20' is connected to a drawing drum 28. The drawing drum is connected to a drive comprised of a gear 29 and an electric motor 30. The electric motor 30 is controlled by a frequency converter so as to apply a constant tension F to the cable wire 22. The motor 30 rotates in both directions and produces a constant moment even at a zero rotation speed. Besides, it is provided with a separate cooling fan motor 31, because the cooling must function even at zero speed of the winch motor 30. The advantage of the winch over the method shown in FIGS. 4 and 5 is that the extra load caused by the weight 25 is eliminated.

The description of the invention only describes principle solutions which are widely combinable. For example, the spring 13 according to FIG. 3 is so large in practice that, because of the requirement for reasonable dimensions, an articulated arm 20 according to FIG. 4 is needed with a large $T_2/T_1$ ratio in order to achieve a reasonable force. Naturally, the counterweight 15 of the unloading conveyor bridge 2' can also be used in the solutions of FIGS. 4, 5 and 6.

The use of the invention allows a considerable reduction of the weight of certain structural parts in a very large storage 1. The details of the structures depend on the needs of each individual storage, because, in addition to the size of the storage, there are other significant variables such as the required discharging effect and the foundation conditions.

The invention claimed is:

1. A method of supporting a substantially horizontal conveyor bridge with supports in the area of each of the bridge ends as well as in at least one point therebetween, said bridge being rotatable around one of its ends along the ground, whereby each support is a locally and directly ground-based support,
    the method comprising maintaining a support force of at least one of the supports in a substantially set value by adjusting a support extension of the support in the vertical direction while running across level deviations of the ground during rotation of the bridge around one of its ends.

2. The method as defined in claim 1, wherein the support that is adjusted is the support between the ends of the conveyor bridge.

3. The method as defined in claim 1, wherein the support is adjusted using spring force.

4. The method as defined in claim 1, wherein the support is adjusted using fluid pressurization.

5. The method as defined in claim 1, wherein the support is adjusted using gravity loading.

6. A method of supporting a substantially horizontal conveyor bridge rotatable along the ground around one of its ends comprising:
    supporting the conveyor bridge with a support at a first bridge end;
    supporting the conveyor bridge with a support at a second bridge end, opposite the first bridge end; and supporting the conveyor bridge with at least one support therebetween, wherein each support is a locally and directly ground-based support, and further comprising maintaining a support force of at least one of the supports in a substantially set value by adjusting a support extension of the support in the vertical direction while running across level deviations of the ground during rotation of the bridge around one of its ends.

7. The method as defined in claim 6, wherein the support that is adjusted is the support between the ends of the conveyor bridge.

8. The method as defined in claim 6, wherein the support is adjusted using spring force.

9. The method as defined in claim 6, wherein the support is adjusted using fluid pressurization.

10. The method as defined in claim 6, wherein the support is adjusted using gravity loading.

11. The method as defined in claim 1, wherein the ground with level deviations across which the support is run is a support track.

12. The method as defined in claim 6, wherein the ground with level deviations across which the support is run is a support track.

\* \* \* \* \*